Dec. 1, 1959  H. O. SCHERENBERG  2,914,963
BALANCING MECHANISM FOR MULTI-CYLINDER PISTON ENGINES
Filed Feb. 11, 1955
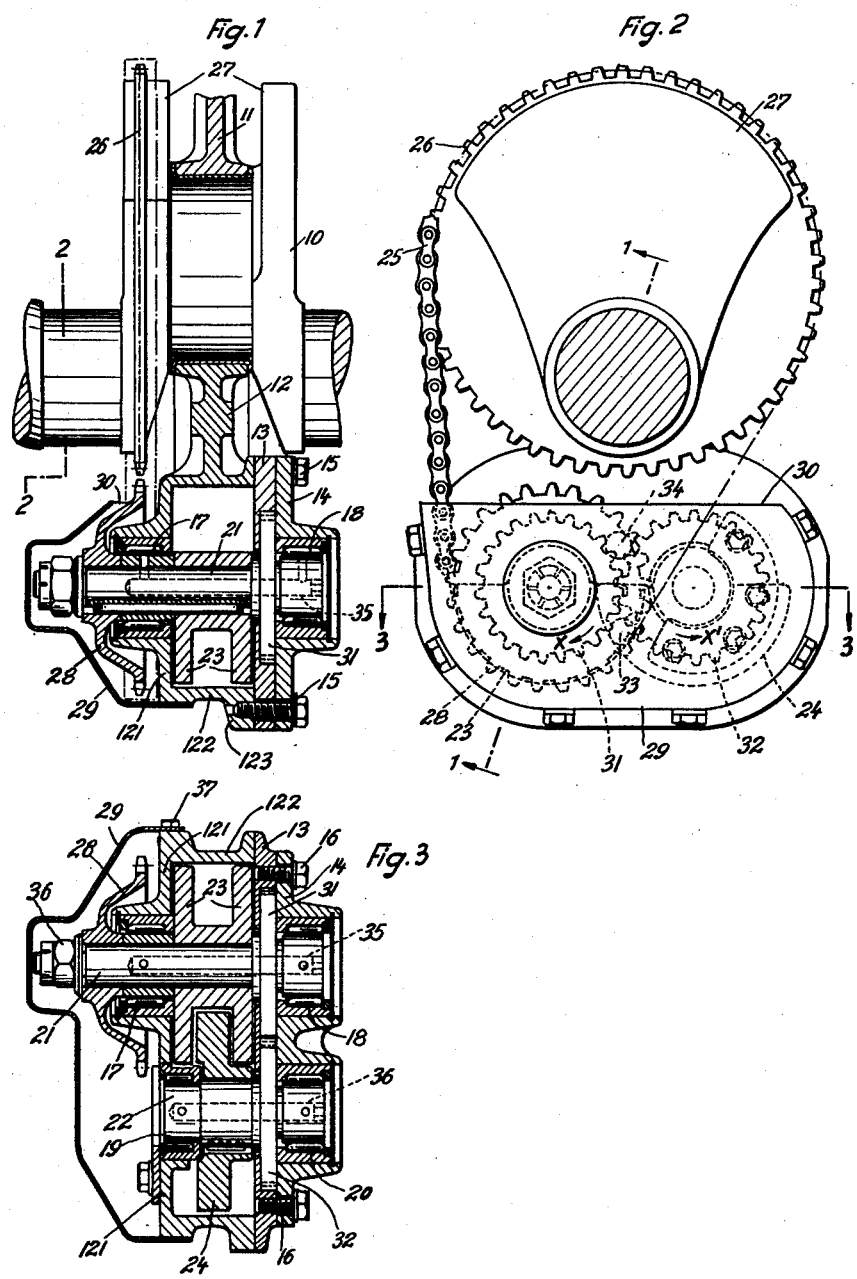
Inventor
HANS O. SCHERENBERG
BY Dicke and Gray
ATTORNEYS.

United States Patent Office 2,914,963
Patented Dec. 1, 1959

2,914,963

BALANCING MECHANISM FOR MULTI-CYLINDER PISTON ENGINES

Hans O. Scherenberg, Stuttgart-Heumaden, Germany, assignor to Daimler-Benz Aktiengesellschaft, Stuttgart-Unterturkheim, Germany Application February 11, 1955, Serial No. 487,672

Claims priority, application Germany February 13, 1954

2 Claims. (Cl. 74—604)

My invention relates to an improved balancing mechanism for multi-cylinder piston engines, such mechanism serving to balance the free mass forces of the second degree produced by the reciprocating pistons and connecting rods of the engine. More particularly, my invention relates to a balancing mechanism of the kind indicated in which a pair of rotary eccentric masses revolve at twice the speed of the crankshaft within a housing disposed below the crankshaft of the engine in the crank casing thereof.

It is the object of my invention to improve the efficiency of such a balancing mechanism by reducing the power required to rotate a pair of eccentric masses. A more specific object of the invention resides in keeping the housing of the balancing mechanism substantially free from oil in order to prevent the masses rotating therein from whipping up foam. A further object of the invention is the provision of an improved balancing mechanism of the character indicated which is compact, simple, efficient, and reliable and may be readily accommodated in the crank case of the engine beneath the crankshaft thereof, such mechanism including a gear pump.

Further objects of my invention will appear from the detailed description of a preferred embodiment thereof illustrated in the drawings, and the features of novelty will be pointed out in the claims. I wish it to be clearly understood, however, that such detailed description serves the purpose of explaining my invention rather than that of restricting or limiting the same.

In the drawings:

Fig. 1 is a partial longitudinal section through a four-cylinder piston engine showing the central portion of the crankshaft, the central line bearing thereof, and my novel balancing mechanism mounted on such line bearing below thereof, the section being taken substantially along line 1—1 of Fig. 2.

Fig. 2 is the vertical transverse section through the crankshaft taken along line 2—2 of Fig. 1, showing a side view of the balancing mechanism.

Fig. 3 is the horizontal section through the balancing mechanism taken along the line 3—3 of Fig. 2.

The crankshaft 10 of the four-cylinder piston engine is journalled in a number of, preferably three, line bearings, each line bearing being composed of a basic section, such as 11, fixed to or integral with the cylinder block and of a detachable cover section, such as 12, which is suitably bolted to the basic section 11 by suitable screws not shown. The cover section 12 of the central line bearing is formed with a depending projection shaped as a housing which has a substantially flat end wall 121 extending vertically at right angles to the axis of the crankshaft and a substantially oval side wall 122 extending at right angles to the flat wall 121 and provided with a flange 123 to which a cover composed of superimposed plates 13 and 14 is secured by a plurality of circumferentially distributed screws 15 and 16. A pair of parallel shafts 21, 22 disposed symmetrically with respect to a vertical longitudinal plane including the axis of the crankshaft are journalled in suitable anti-friction bearings, such as roller or needle bearings 17, 18, 19 and 20. The bearings 17 and 19 are provided in suitable openings of the end wall 121 whereas the bearings 18 and 20 are disposed in suitable openings of the cover plate 14. Eccentric masses are secured to the shafts 21 and 22 within the housing, one of the masses being formed by a pair of spaced parallel semi-circular disks 23 integral with a hub and the other one of the masses being formed by a single semi-circular disk 24 integral with a hub keyed to shaft 22, the disk 24 having a width less than the width of the space between the disks 23 and mounted in registry with such space.

Shaft 21 is extended beyond bearing 17 and adapted to be driven by a toothed element, such as sprocket 28, secured to its end and held in position thereon by a nut 36. Another toothed element of twice the diameter of element 28, such as a sprocket 26, is mounted on the crankshaft coaxially with the axis thereof. In the embodiment shown the sprocket 26 is integral with one of a pair of counter weights 27 fixed to the crankshaft 10 on both sides of the central line bearing 11, 12. A sprocket chain 25 extends around the sprockets 26 and 28 and drives shaft 21 at twice the speed of the crankshaft. A sheet metal cover 29 is secured to the housing 121, 122 by suitable screws, such as 37, and surrounds the major portion of the sprocket 28 including the lower portion thereof. The cover 29 constitutes a pocket open at its top 30 only from which the elements 28 and 25 project.

The shaft 22 is geared to shaft 21 for rotation at the same speed in opposite directions. For this purpose a gear 31 is secured to shaft 21 and meshes with a gear 32 secured to shaft 22.

The two gears 31 and 32 constitute a gear pump which communicates with interior space of the housing 121, 122 and preferably with interior space of the cover 29 to suck such spaces free from oil whereby the resistance encountered by the rotating masses 23 and 24 will be decreased and the power required to drive the masses will be considerably reduced.

As will appear from Figs. 1 and 3, the outer face of plate 13 is provided with a pair of circular recesses which accommodate the gears 31 and 32 and are closed by the plate 14 and the outer faces of bearings 18 and 20 mounted therein. The peripheral walls of such recesses embrace closely the periphery of the meshing gears 31 and 32 to thereby form a gear pump. The cover plate 14 is provided with an inlet port 33 and an outlet port 34, and a duct leads from a port at the bottom of housing 121, 122 to the inlet port 33, whereas the port 34 opens into the interior of the crank case. Therefore, when the gears 31 and 32 rotate in the directions indicated by the arrows $x$ and $x'$ in Fig. 2, the gear pump will suck oil through the port 33 from the interior of housing 121, 122 and will feed it out thereof into the crank case. Preferably the interior of housing 121 and 122 communicates with the interior of the sheet metal cover 29 by a suitable aperture not shown. Therefore, the pump will also keep the interior of cover 29 free from oil and will thereby prevent foam from being produced therein by the rotating toothed element 28.

The bearings 17 to 20 may be lubricated by axial lubricating ducts 35, 36 which are provided in the shafts 21 and 22 and may be connected with any suitable source of lubricating oil.

If desired, the gear pump 31, 32 may be used for any other suitable purpose, for instance as a lubricating pump for lubricating the engine.

The semi-circular disks 23 and 24 are so dimensioned that their common center of gravity will be located substantially in the vertical longitudinal plane including the crankshaft axis and a vertical transverse plane extending through the central line bearing.

From the above explanation it will appear that I have provided the internal combustion piston engine with an improved balancing mechanism adapted to balance the free mass forces of the second degree produced by the reciprocating pistons and connecting rods, such mechanism including rotary eccentric masses revolving within a closed housing the interior space of which is kept free from oil by a pump, such pump being preferably constituted by a pair of gears gearing the rotating masses to each other for rotation in opposite directions. Moreover, it will be understood that such pump may be used for any other desired purpose, for instance for lubricating purposes. The fact that the oil is removed from the housing accommodating the rotating masses offers the advantage that no oil foam will be whipped up and will not hinder the rotation of the masses at high speeds. At the same time the housing surrounding the rotating masses will act as a sound insulation to reduce the noise produced by the meshing gears. Since the pair of gears constituting the pump is disposed in proximity to the rotating balancing masses, no conduits or pipes of great length are required to keep the housing free from oil. The housing for the rotating masses and the gear pump are preferably constituted by an extension of the detachable cover part of a line bearing, particularly of the central line bearing. The rotating masses may be driven by motion transmitting means, such as gears or sprockets, disposed directly adjacent to the housing. Preferably a sheet metal cover or the like may be provided to shield the sprocket or gear mounted on the shaft of one of the rotating masses from the interior of the crank case.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a four-cylinder piston engine the combination comprising a four-throw crank shaft, a central line bearing therefor including a detachable lower section, a closed housing located beneath and integral with said lower deatchable section of said line bearing, a pair of shafts extending parallel to said crank shaft and being journalled in said housing, one end of one of said shafts extending out of said housing, a toothed element mounted on said end to be driven by said crank shaft at twice the speed thereof, a cover secured to said housing and surrounding the major part of said toothed element including the lower portion thereof, a pair of meshing gears secured to said shafts to gear the same for opposite direction, a gear pump including said pair of gears and having an inlet port communicating with the interior space of said housing and of said cover to suck oil therefrom and having an outlet port opening into the space surrounding said housing, and eccentric masses secured to said shafts for balancing the free mass forces of the second degree of said engine, said pump and said masses being encased in said housing.

2. The combination claimed in claim 1 in which said housing is provided with anti-friction bearings rotatably supporting said pair of shafts, the latter being provided with axial lubricating ducts leading to said anti-friction bearings.

References Cited in the file of this patent

UNITED STATES PATENTS

| 1,163,832 | Lanchester | Dec. 14, 1915 |
| 1,164,367 | Lanchester | Dec. 14, 1915 |
| 1,539,607 | Spring | May 26, 1925 |
| 1,658,979 | Fisher | Feb. 14, 1928 |
| 2,214,921 | Criswell | Sept. 17, 1940 |
| 2,688,839 | Daub | Sept. 14, 1954 |
| 2,745,238 | Hopkins | May 15, 1956 |